United States Patent [19]

Stäheli et al.

[11] Patent Number: 5,444,513
[45] Date of Patent: Aug. 22, 1995

[54] PROCESS FOR OPERATING A PHOTOGRAPHIC PROCESSING APPARATUS AND AN APPARATUS FOR PHOTOGRAPHIC PROCESSING

[75] Inventors: Willi Stäheli, Untersiggenthal; Rudolf Tschannen, Regensdorf, both of Switzerland

[73] Assignee: Gretag Imaging AG, Regensdorf, Switzerland

[21] Appl. No.: 364,399

[22] Filed: Dec. 23, 1994

Related U.S. Application Data

[63] Continuation of Ser. No. 81,201, Jun. 25, 1993, abandoned.

[30] Foreign Application Priority Data

Jun. 26, 1992 [CH] Switzerland ............... 2023/92

[51] Int. Cl.$^6$ ............................................. G03D 3/13
[52] U.S. Cl. ........................................ 355/27; 354/322
[58] Field of Search ............. 354/319, 320, 321, 322; 355/27, 28, 29, 35, 40, 77

[56] References Cited

U.S. PATENT DOCUMENTS

| | | |
|---|---|---|
| 4,417,811 | 11/1983 | Hamer . |
| 4,782,354 | 11/1988 | Gregoris . |
| 4,967,222 | 10/1990 | Nitsch ............................ 354/321 |
| 5,095,342 | 3/1992 | Farrell et al. ..................... 355/23 |
| 5,130,750 | 7/1992 | Rabb ............................... 355/208 |
| 5,146,601 | 9/1992 | Hosake et al. .................... 355/208 |
| 5,270,773 | 12/1993 | Sklut et al. ....................... 355/201 |

FOREIGN PATENT DOCUMENTS

| | | |
|---|---|---|
| 0443443 | 2/1991 | European Pat. Off. . |
| 2949290 | 6/1981 | Germany . |
| 3623084 | 1/1987 | Germany . |

OTHER PUBLICATIONS

European Search Report RS 90400 CH; dated Mar. 3, 1993.

"A Computerised Film Laboratory: Economic Reality or Futuristic Dream" by Nigel Varian; British Kinematography Sound and Television Society, Journal, vol. 66, No. 2, Feb. 1984, London GB, pp. 50-60.

*Primary Examiner*—Michael L. Gellner
*Assistant Examiner*—Daniel P. Malley
*Attorney, Agent, or Firm*—Burns Doane Swecker & Mathis

[57] ABSTRACT

A photographic processing apparatus which allows the throughput time of a client order to be optimized. The processing apparatus includes a modular design and comprises various processing modules to process exposed photographic film material and/or photographic copy material. The individual processing modules each include one or several processing stations, through which the exposed film material and/or photographic copy material passes in succession, according to demand. The inventive operating process for the photographic processing apparatus is characterized in particular in that the control of the throughput speed and processing speed of the film material and/or the copy material is hierarchically designed and comprises two levels. Here the processing speed of the film material or copy material in any preceding processing station is locally controlled in the given module in accordance with the speed of a processing station through which film material or copy material passes at a constant and predetermined rate. At the same time, the various processing modules are connected by way of signal lines to a superordinate central control unit, which assumes the central control functions and which monitors the operation of the individual processing modules to optimize the throughput of film material and/or copy material through the photographic processing apparatus.

28 Claims, 4 Drawing Sheets

PROCESS FOR OPERATING A PHOTOGRAPHIC PROCESSING APPARATUS AND AN APPARATUS FOR PHOTOGRAPHIC PROCESSING

This application is a continuation of application Ser. No. 08/081,201, filed Jun. 25, 1993, now abandoned.

BACKGROUND OF THE INVENTION

The present invention generally relates to a photographic processing method and a photographic processing apparatus for processing exposed photographic film material and/or photographic copy material. A photographic processing apparatus includes individual processing stations, through which the exposed film material and/or photographic copy material passes in succession.

Photographic laboratories which process exposed film material of certain types are increasingly under pressure from their clients, who wish to have their orders filled in ever shorter periods of time. To this end the individual processing steps—from the receipt of the exposed film material to the preparation of the desired number of copies of a desired format, usually paper prints in a format of 3"×4.5" to 5"×7.5", and finally to packing of the negatives and prints—are performed by various high-speed machines, with some manual support. The individual machines operate independently of each other and at separate speeds. A photographic processing apparatus that performs the necessary process steps comprises the following processing machines or processing stations and activities:

film splicer: the film tins are removed from the order bags and opened and the film is removed; a number of film rolls are spliced together and coiled on a reel;

film processor: the exposed film is developed;

film notcher: the image positions on the film are identified and the film is marked with a notch for the subsequent processing steps;

printer: the desired number of copies of the developed film negatives are created on unexposed copy material (photographic paper);

copy material processor: the exposed copy material is developed;

final processing: the film is cut into short strips (usually of four pictures each); the individual pictures on the developed tape-like copy material are cut; film strips and corresponding pictures are repacked into the order bags according to assignment.

The film material and copy material are coiled onto rolls between individual processing machines and are usually transported manually. Management and transport of the film rolls or copy material rolls and of the order bags is personnel-intensive and often represents a source of error when individual film rolls, paper rolls, or order bag bundles are mistakenly interchanged. The rolls are made as large as possible in order to reduce the number of necessary manual transport runs between the individual processing stations. A roll of film or a roll of copy material is only moved to the next processing station when it is full. The result is long throughput times for individual client orders.

Film and copy material processors operate most economically when running at a constant speed and when they are continually filled with film or copy material. If the preceding stations operate more slowly than the corresponding processors due to the fact that the throughput times (development times) of the undeveloped exposed film material or copy materials are predetermined by the selected process, a sufficient number of supply rolls must be produced before the processors are started in order to assure the latter's continuous operation. Thus, the throughput time for a client order is further extended unnecessarily by the processing apparatus. In addition the necessary expense in terms of planning is further enlarged with respect to logistics and roll management.

SUMMARY OF THE INVENTION

The present invention is therefore directed to improving a photographic processing apparatus and a process for operating such an apparatus, such that the entire processing speed is increased to accommodate the client's demand for a shorter throughput time. Furthermore, potential sources of error are eliminated and the planning expenditure in terms of process logistics simplified. An apparatus and an operating process are provided which permit the processing runs to be largely automated and the use of personnel held to a minimum. Economically operating processors of constant speed can be employed which are structurally simpler and less prone to error than film material and copy material processors with variable speeds and throughput paths, and involve smaller investment costs. Furthermore, it becomes possible to economically process client orders at high speed.

In particular, the invention relates to a process for the operation of a photographic processing apparatus which optimizes the throughput time of the client's order through the apparatus. A preferred embodiment of the processing apparatus according to the invention is modular and comprises various modules for processing the exposed photographic film material or copy material. The individual processing modules each exhibit one or several processing stations, and the exposed film and/or copy material pass through them in succession, according to demand. The operating process according to the invention for the processing apparatus is characterized particularly in that control of the throughput and processing speeds of the film and/or copy material has a hierarchical, two-level design. On the one hand, the processing speed of the film or copy material in any given preceding processing station is locally controlled by the speed of a processing station which the film or copy material passes through at a predetermined constant speed. At the same time, the various processing modules are connected by way of signal lines to a superordinate central control unit which monitors the functioning of film and/or copy material through the processing apparatus. The local control of the individual processing modules independently solves all critical time-dependent operations and tasks and thereby permits the central control at the superordinate level to realize optimized function in non-time dependent fashion.

Local control preferably operates according to a "master-slave" principle and runs independently and automatically after operation of the corresponding processing module has begun.

In an exemplary embodiment, the processing apparatus comprises at least one module with a photographic copier and a copy material processor, with an adjoining copy material buffer, for developing the exposed copy material, the two being connected by means of signal lines. The processing speed of the copy material in the copier is locally controlled by the autonomous local control according to the predetermined constant throughput speed of the copy material processor and the fill level of the film buffer.

When the film processing module is provided with a film opening and splicing station and with an assigned film processor and adjoining film buffer for developing the exposed film material, this module's local control assures that the processing speed of the film material in the opening and splicing station is locally controlled according to the predetermined constant throughput speed of the film processor and the fill level of the film buffer.

The photographic processing apparatus will preferably include both of the above-described processing modules. The module containing the photographic copier is positioned adjacent to the film processor.

It is particularly advantageous if the processing speed of the film material in the film opening and splicing station or of the copy material in the copier are controlled in such a way that the fill level of the given buffer is from about 80% to 99%. This permits short-term interruptions in the preceding processing stations to be compensated for, and the given processor can continue to run at the fixed speed preselected for the chosen developing process. For example, it is possible to compensate for short-term interruptions in the opening and splicing station that arise when a splice cannot be correctly performed at the first attempt or when film is identified as damaged or of the wrong type and has to be repaired or removed. To permit this the opening and splicing station can also be equipped with an automatic film inspection station where these identifying and repairing functions are performed.

When the fill or copy material feed is interrupted for longer periods and the fill level drops below a predetermined marking, a leader tape is automatically spliced onto the end of the film or copy material at the entrance of the given buffer and is removed at the exit of the film or copy material processor and returned to the buffer entrance. The minimum fill level of the buffer here is selected in such a way that the time interval that is available before complete emptying of the buffer is always sufficient to perform the splice. Ideally the minimum fill level of the given buffer will be about 5% to about 25% of the maximum fill level, depending on the size of the buffer storage. When the feed of film is cut off at the entrance to the buffer, the front end of the advancing film or copy material is spliced to the back end of the leader tape, and at the exit of the film or copy material processor the front end of the film or copy material tape is separated from the leader tape, which is coiled onto a separate roll. Measures may also permit the new and advancing front end of the film or copy material tape to be spliced to the back end of the film or copy material tape that is waiting ahead of it in the station.

To this end the processing apparatus is equipped with an automatic cutting and splicing device at the entrance of the given buffer and exhibits at least one docking device positioned above or below the cutting and splicing device for a leader tape that ideally has been coiled onto a roll.

At the exit of the corresponding processor an automatic cutting device is also provided and, if so required, an automatic splicing device, as well as a docking device for coiling the leader tape onto a roll. Preferably a docking device for rolls is positioned at the exit of the film or copy material processor, along with a coiling device for coiling the film and copy materials onto the rolls. This permits the film or copy material to be coiled onto rolls at the exit of the given processor. Film or copy material rolls are particularly suited as space-savings storage for large quantities of the material being processed and easily permit manual intrusions for the correction of error.

The central control unit particularly monitors and controls the fill level of the film or copy material rolls positioned at the exit to the given processors according to the load level of the processing stations. This means that a greater or smaller number of filled rolls are produced at the exit of the given processors. The criterion for the fill level of the rolls is no longer provided by the transport path or the transport time between the individual stations, which formerly resulted in the rolls being completely filled whenever possible and in the residence time of a client order in the processing apparatus being unnecessarily extended. Now the central control monitors the load level of the individually involved processing modules and thereby controls the fill level of the rolls. This permits a short-term reaction to variations in speed in the involved stations.

This control concept is particularly advantageous if the rolls are transported from one processing module to the next by means of fully automated transport devices. Here the central control unit controls the transport of the rolls according to need, as well as the load level of the processing modules, and the transport devices are employed as buffer storage.

The film material will preferably be coiled onto rolls at the copier exit. Here the central control unit controls both coiling the film material and coiling the copy material at the exit of the copy material processor module, and in such a way that a roll of copy material, with assigned copies, is produced for each film material roll, with the film roll and the copy material roll exhibiting the same sequence of copy masters and copies. Copy masters and the appertaining copies are positioned on the corresponding rolls in such a way that the temporal processing sequence is maintained. This means that the copy master first fed to the processing apparatus is on the outside of the roll. The same naturally applies to the corresponding copies.

In a completely integrated photographic processing apparatus, which preferably includes a fully automated cutting and packing station as a final processing module, the central control unit controls the transport of film rolls from the photographic copier and the transport of copy material rolls from the exit of the copy material processor in such a way that correlated film and copy material rolls arrive simultaneously at the cutting and packing station. In a preferred embodiment, the transport to the cutting and packing station of film material rolls from the copier and the copy material rolls from the copy material processor are aided by fully automatic transport devices which are operated by the central control unit and function as transport buffers. If fully automatic transport devices are not provided and the rolls must be manually transported, the central control unit will give the appropriate signals to the operator. These signals can be acoustic ones or there can be a display on the visual screen, or a combination of the two, to inform the operator of the need to transport the rolls.

The order bags containing film rolls—from which the necessary order data has been obtained in the film opening and splicing station—will also be preferably controlled by the central control unit in their transport by fully automatic transport means from the opening and splicing station to the cutting and packing module, and in such a way that the order bag sequence corresponds to the sequence of the copy material strips on the copy material rolls also transported to the cutting and packing module.

It is of particular advantage if the individual processing modules and stations transmit information on a client order located in a given station via signal lines to the central control unit, preferably permitting data exchange in both directions, so that at any time a specific client order can be located within the processing apparatus.

In order to minimize the throughput time of a client order through the processing apparatus, the apparatus and operating process are so designed that the client order that is first fed into the processing apparatus is also the first to leave it in processed condition.

The central control unit will preferably register the position coordinates determined in the copier of the individual copy masters on the film material strips. This data is transmitted from the central control to the cutting packing station, where the film material strips will be cut at the proper points. This method eliminates the need for a notch device which stamps markings on the strip within the copier.

When the number of the individual copy masters on the film material strip is also recorded in the copier, for example, by reading the expanded DX code located on the film material strip, it is also highly advantageous to register this information by means of the central control unit. The data is transmitted from the central control unit to, e.g., the cutting and packing station, where, e.g., the corresponding master number is printed on the front or reverse side of the appertaining copy or copies by means of a printing device.

Control of the processing apparatus according to the invention is hierarchically designed to comprise two levels. A local control is provided for the individual processing modules and autonomously controls most of the critical time-related tasks performed by the given module. The combination of the stations in the individual processing modules thus independently makes available certain basic functions. Building on these basic functions, a superordinate central control monitors the processing operation in the processing apparatus overall and optimizes the throughput time and the individual station loads.

At a minimum the photographic copier is incorporated into the design optimizing the entire process flow. To this end the copier exhibits docking devices at its entrance and exit for film material that has been or will be coiled onto rolls, and an adjustment device is provided at the copier entrance for at least one cassette containing unexposed copy material coiled onto a roll. In conjunction with attached and, in a preferred embodiment, fully automatic transport devices for the film material rolls and, if necessary, for the copy material cassettes, the central control unit is able to incorporate the copier application and load level in the optimization process.

BRIEF DESCRIPTION OF THE DRAWINGS

Other objects and advantages will become apparent from the following detailed description of preferred embodiments of the invention as described in conjunction with the accompanying drawings wherein like reference numerals are applied to like elements and wherein.

DETAILED DESCRIPTION OF THE PREFERRED EMBODIMENTS

Figure 1:
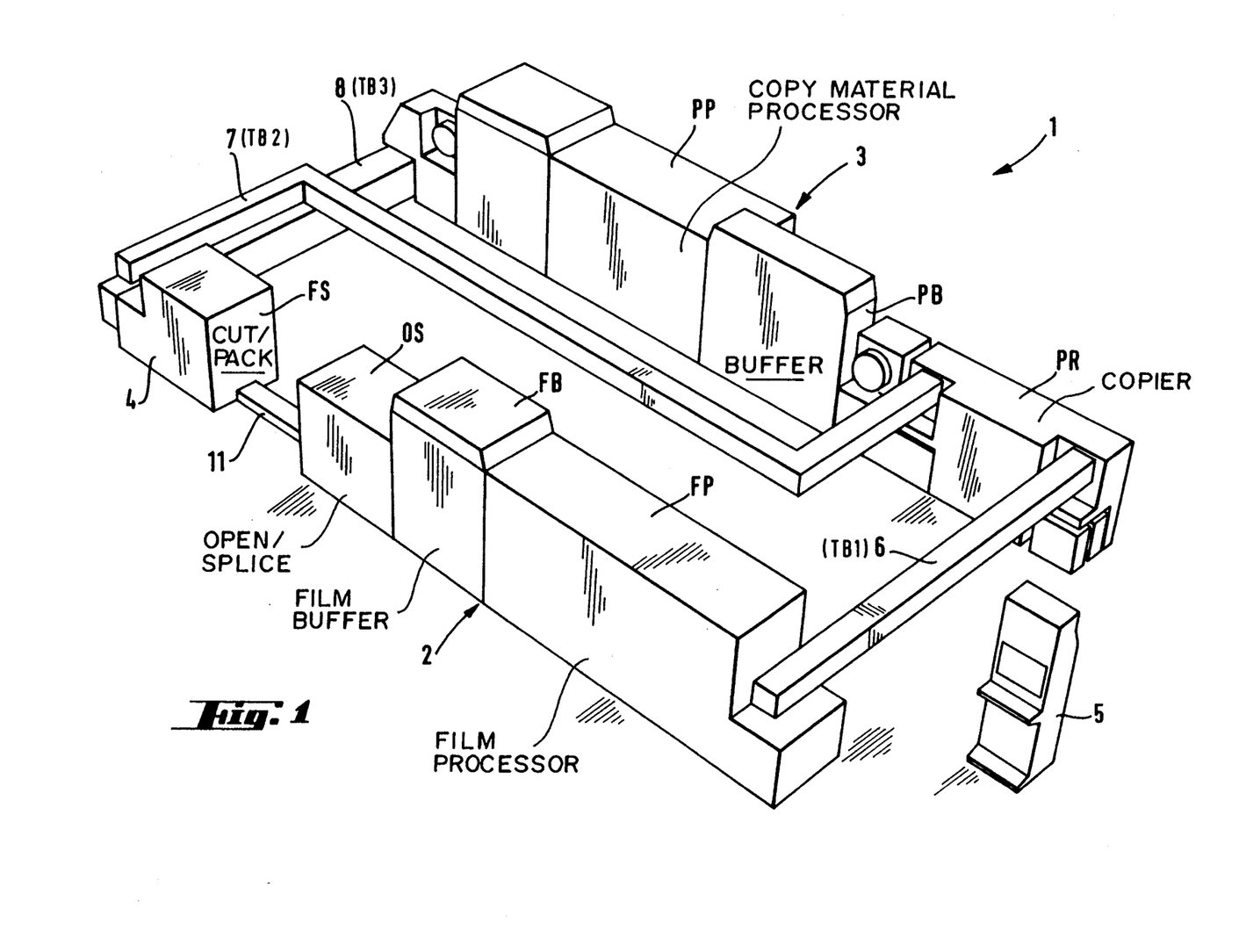
FIG. 1 shows an overview of an integrated photographic processing apparatus.

FIG. 1 shows an exemplary embodiment of a photographic processing apparatus according to the invention. The processing apparatus in its entirety is designated by reference numeral 1 and comprises various processing modules 2, 3, 4. Each processing module in turn comprises at least one processing station, by means of which a given work stage is performed during processing of a client order. In particular, the first processing module 2 comprises a film opening and splicing station OS and a connecting film processor FP. The film opening and splicing station can also be enlarged to include an automatic film inspection station, which executes an examination and repair function for the film roll material. Located between the film opening and splicing device OS and the film processor FP is a film buffer FB, which is integrally connected to the film processor FP. A second processing module is indicated in FIG. 1 by reference numeral 3 and connects with the first processing module 2. It comprises a photographic copier (photographic printer) PR and a copy material processor PP which connects to the copier. The part of the copy material processor PP which connects to the copier PR is designed as a copy material buffer PB. Finally the processing device 4 at the exit side of the processing apparatus 1 is formed by a cutting and packing device FS. In a preferred embodiment, the film processor FP and the copy material processor PP are so-called constant speed processors, in which the film material and copy material follow a path of constant length through the wet part. Processors of this type are relatively simple in design, reliable, highly proven, and relatively inexpensive.

The passage of client orders through the processing apparatus will next be explained in greater detail on the basis of FIG. 2. At the entrance side of the processing apparatus 1, order bags B delivered by the client and containing film cartridges C are opened, usually by an operator, and the film cartridges are removed and preferably filled into a magazine and fed to the film opening and splicing station OS belong to the first processing module 2. Here, film cartridges which can not be processed are preselected and are removed by the operator, along with the order bag B. The information on the given client order usually recorded on the order bag B is transmitted to the central control unit (FIGS. 1 and 2) by input means. The order bags B are preferably bundled together and transported to a packing station FS. In a preferable embodiment, this transport is performed by automatic transport devices 11, for example, a conveyor belt or the like.

Each cartridge is opened in the film opening and splicing station OS and the film is automatically taken out. If an automatic film inspection station is provided, the film is examined and is repaired as needed or is eliminated from the process. The acceptable or repaired film material strips are spliced together into a tape. The film material N in the form of a long tape is then guided by way of the buffer FB into the film processor FP to be developed. After being developed, the film material N is coiled into a film roll F at the exit of the film processor FP and is automatically cut at a certain fill level. The film rolls F are transported along a transport path 6 to the next processing module 3 and are positioned at an inputside of the copier PR.

The still unexposed copy material M (see FIG. 3), usually unexposed photographic paper, is fed to the copier coiled onto rolls and placed in cassettes P'. When a cassette P' is empty, a new filled cassette P' will be docked, preferably in automatic fashion, and the new copy material spliced to the old, so that the copier can be almost continuously fed with copy material. The copy material M is then exposed with the developed film material N according to the order. The exposed copy material M is then fed as a continuous tape to the copy material processor PP via the copy material buffer PB and is developed. After being developed, the exposed and developed copy material M is coiled into a roll, preferably contained in a cassette, at the exit to the copy material processor PP, and is automatically cut at a given fill level. The film material N is also coiled into a roll F at the exit of the photographic copier PR.

The film material rolls F are transported along transport path 7 (FIG. 1) and the copy material cassettes 30 along transport path 8 to reach the final processing module 4, which comprises the cutting and packing station FS. There the film material N and the copy material M are cut according to the order and packed into the order bags B delivered over transport path 11. The completely processed client orders O, with the film strip packed in the order bags B and with the desired copies, can be removed at the exit of the processing apparatus 1.

Figure 2:
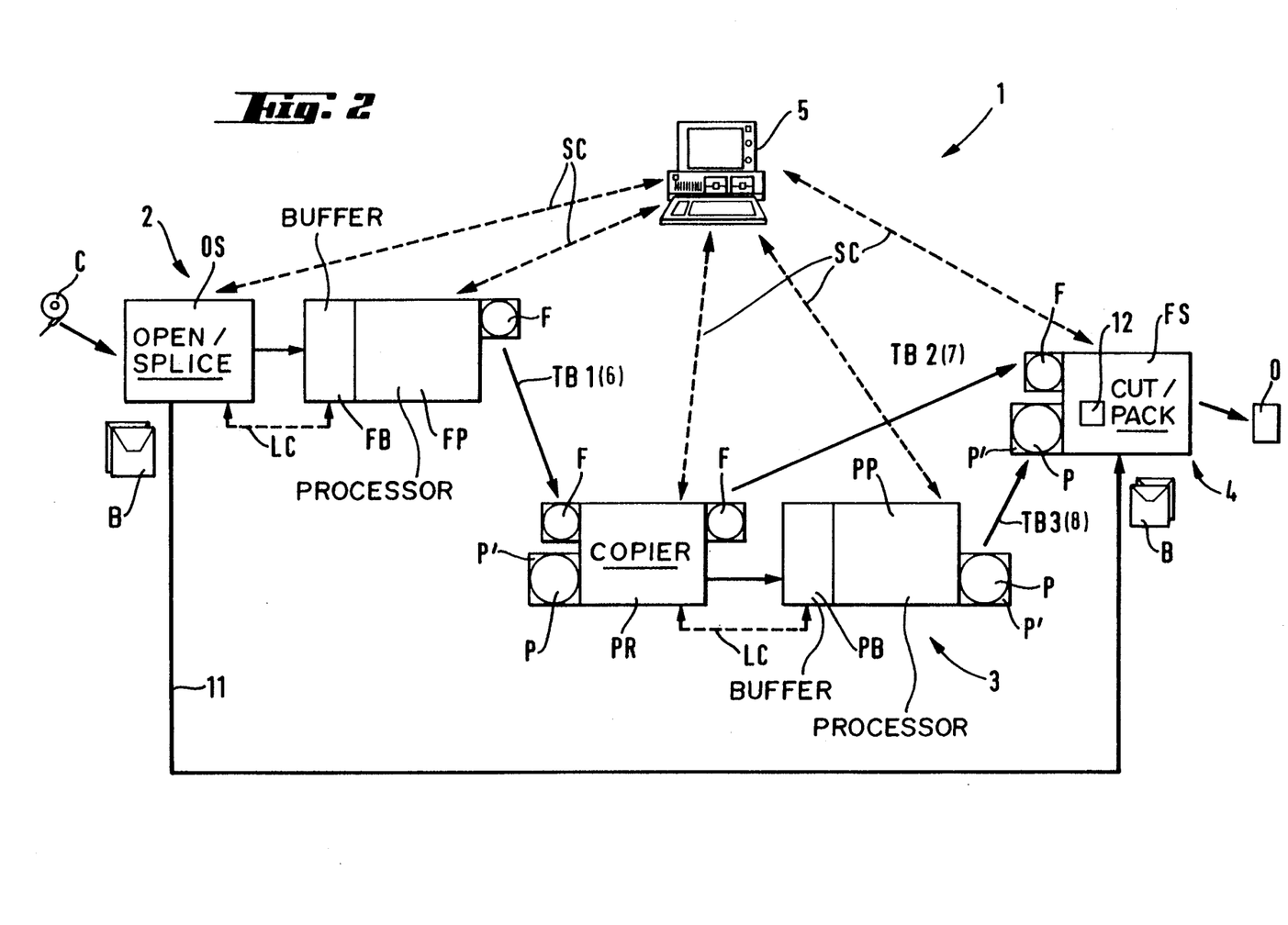
FIG. 2 shows a block diagram of the processing apparatus of FIG. 1.

The transport paths designated by reference numerals 6, 7, 8, and 11 in FIGS. 1 and 2 indicate transport devices for film material coiled into rolls F, for the copy material rolls P, and for order bags B, preferably packed into bundles, as the material moves from one module to the next. Transport devices 6, 7, 8, and 11 preferably provide fully automatic operation and can take the form of, for example, conveyor belts, transport lifts, or the like, or a combination of different transport devices.

The function of a preferably electronic control unit 5 shown in FIGS. 1 and 2 will now be described in greater detail in connection with an exemplary operating process according to the invention.

The described photographic processing apparatus exhibits a number of processing stations which together can be operated at highly varying speeds. In particular it must be noted that processor FP for the film material N and processor PP for the copy material M must each be operated at a predetermined constant speed in order to assure uniform development of the film material or the copy material. The system of processors can only operate smoothly when the ratio of film length to copied copy material length is constant. This is practically never the case, however, and the copy material length copied from a corresponding film may vary from order to order. On the one hand, the copied copy material length may be greater in the case of long picture formats or in the case of multiple copies made from one master; on the other hand, it may be smaller for shorter picture formats and when masters are skipped because of their poor quality.

According to the invention, therefore, the average speed of the film material N in the film processor FP or of the copy material M in the copy material processor PP is reduced, when so required, by non-continuous operation. This is realized by a hierarchically designed, two-level control system. A local control LC (FIGS. 2 and 3) between the processor and its predecessor device controls the speed of the predecessor device as long as there is sufficient material in the buffer and the processor is able to operate at the necessary speed; it then automatically inserts a leader tape L when the film level of the corresponding buffer drops below a given value. A superordinate central control SC determines the optimal time for exchanging the film rolls F or the copy material rolls P and for closing the gaps. The local control employs simple signal lines between the devices involved and is integrated into the processing modules.

Figure 3:
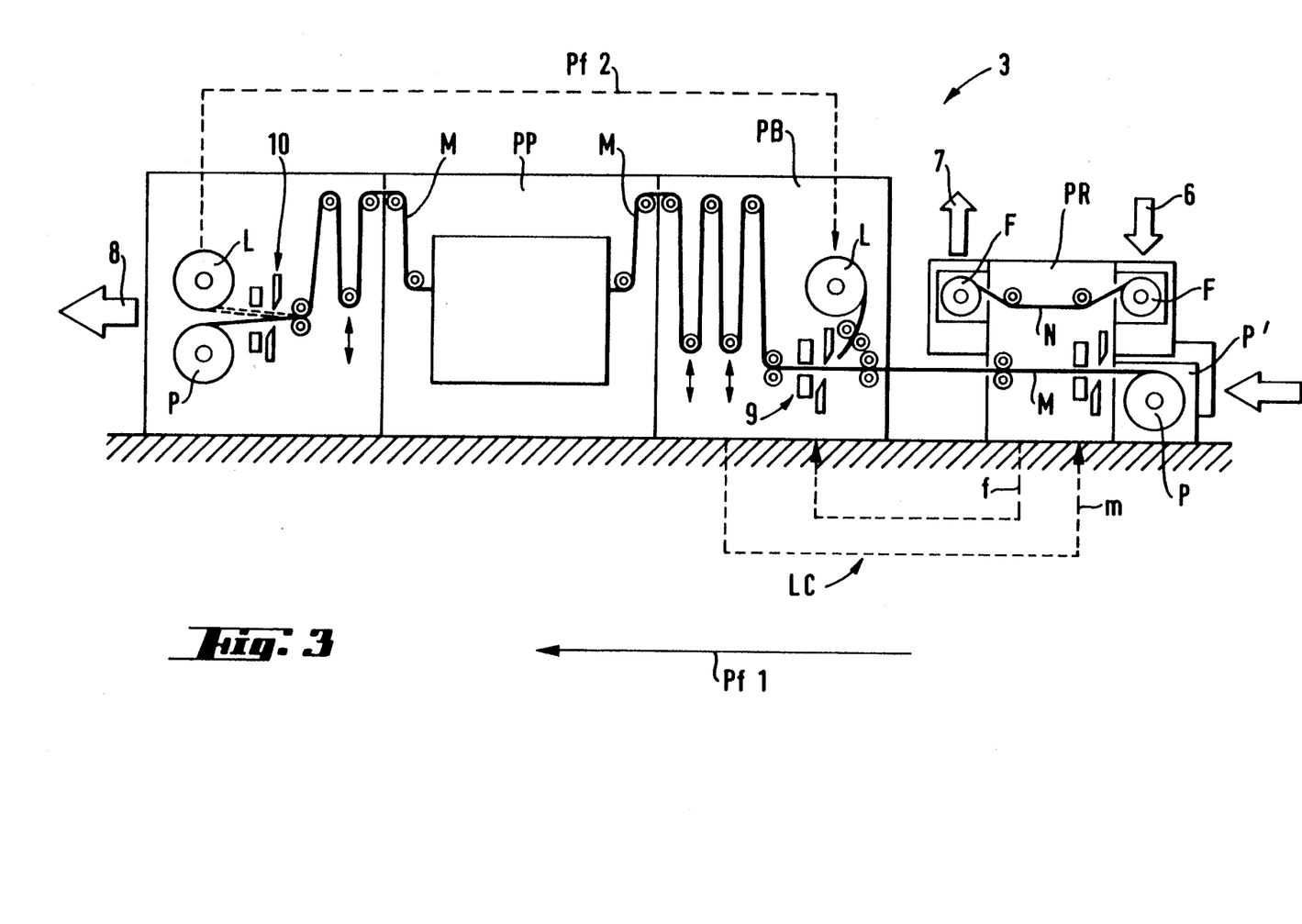
FIG. 3 shows a processing module comprising a photographic copier and a copy material processor.

The use of the local control LC is explained in greater detail below on the basis of the second processing module 3 with reference to FIG. 3. The second processing module 3 comprises the photographic copier PR and the copy material processor PP with adjoining copy material buffer PB. The material flow in this processing station is indicated by the arrow Pf1. The copy material buffer PB at the entrance to the copy material processor PP is preferably designed as a loop storage. A sensor provides a signal when the buffer has almost reached its full level. The copying speed of the copier PR is then controlled by the copy material processor PP in such a way that the buffer is preferably kept at about 80% to about 99% full. Given short interruptions in the copying process in the copier, the buffer content is reduced somewhat and then brought back to the original level after resumed operation of the copier PR at increased speed. However, if the copier is, e.g., no longer able to provide exposed copy material M to the processor PP due to the absence of film material F, the copy material buffer PB drops below a minimum fill level and a sensor provides a further signal. This signal causes a leader tape L to be spliced to the back end of the copy material M in a cutting and splicing device 9 positioned at the entrance to the buffer PB. The leader tape L is unrolled from a supply roll positioned above or below the cutting and splicing device 9. In this manner and despite the interrupted copy operation in the copier PR, the copy material M can be further transported at a constant speed through the copy material processor PP, particularly through its wet part. At the exit side of the copy material processor PP another cutting and splicing device 10 is preferably positioned, whose design corresponds to that at the entrance side. In principle a cutting station alone would suffice at the exit side. At that point the leader tape L is cut from the copy material and preferably coiled onto a roll.

When the copier PR is again ready to provide copy material M, the material is automatically threaded into the transport path leading to the cutting and splicing station 9. There the leader tape is cut off and the front end of the new copy material M is spliced onto the back of the leader tape L. At the exit side of the copy material processor PP the leader tape L is separated from the developed copy material M and is coiled. The roll with the coiled lead tape L can be returned to the entrance side of the copy material buffer PB, as indicated by the arrow Pf2 in FIG. 3. The front end of the new developed copy material can be spliced to the back end of the developed copy material waiting in the station or can be fed to a new roll.

The principle of local control LC, which has been described on the basis of the second processing module 3 with the copier and copy material processor PP, follows the master-slave principle. The processor PP is the master and the preceding processing station—in this case the copier PR—is the slave. Naturally this principle applies as well to the first processing module 2, comprising the opening and splicing station OS and the film processor FP. In this case the speed of the opening and splicing OS—the preceding processing station—is controlled by the following film processor FP. Depending on the fill level of the film buffer positioned at the entrance to the film processor FP, the speed of the preceding opening and splicing station OS will vary. In the case of longer interruptions a leader tape L is introduced to maintain the continuous operation of the film processor FP in a procedure analogous to that described above for the second processing module 3.

The fact that the processor, running at a fixed and predetermined speed, controls the speed of the feeder machine according to the master-slave principle, and the further fact that the device combination can react autonomously to longer interruptions in the material feed, permit the use of small, space-saving buffers between the individual devices. The local control LC in the processing stations 2 and 3 solves critical time-related operations and tasks independently and thereby allows the superordinate control level in the central control unit to perform its optimizing role in functions not critically related to timing. The combination of processing stations brought together in one processing module independently provides certain basic functions and allows the central control SC to provide an optimizing role with respect to the throughput time of a client order and to the load of the individual devices.

The film material N is coiled onto rolls at the exit of the film processor FP. The film rolls F are preferably transported to docking devices for the film rolls F provided at the entrance to the copier PR. There the film material N is preferably threaded automatically into the copier PR. At the exit of the copier PR there are analogous docking devices for film rolls F onto which the film material N is again coiled. The film rolls are transported, preferably with automatic transport devices 7, from the exit side of the copier PR to the cutting and packing station FS. The exposed and developed copy material M is also coiled onto rolls, preferably positioned in cassettes, at the exit of the copy material processor PP. The copy material cassettes P are also finally transported to the last processing station 4 with the cutting and packing device FS, preferably by automatic transport devices 8. There the film material N and the copy material M is cut and packed according to order. The fully processed client orders O can finally be removed at the exit of the last processing station 4.

The use of film rolls F and of copy material rolls P permits the simple introduction of long-term storage with varying fill levels. In conjunction with the central control SC, the long-term storage can be highly effective in optimizing the throughput time of the client orders O and the processing device loads. The use of automatic transport devices monitored and controlled by the central control unit permits even more enhanced optimization. In particular, the central control unit SC monitors and controls the fill level of the film and copy material rolls F and P located at the processing modules. This means that more or less full rolls F or P are produced at the exit of the given processor FP or PP, according to need. The criterion for the fill level of the rolls is no longer provided by the transport path or the transport time required by the operating personnel between the individual modules, which formerly resulted in the rolls being completely filled to the extent possible and in the residence time of a client order in the processing apparatus being unnecessarily extended. Now the central control unit SC monitors the load level of the individually involved processing modules 3 and 4 and controls the fill level of rolls F and P accordingly.

The transport paths and the transport devices 6, 7, and 8 for transporting the film rolls F and the copy material rolls P, together with the adjustment capability in the target stations, play the role of buffer storage, which in this case take the form of roll storage. Here the exit side of the given station FP, PR, and PP is included with the given transport device. The transport area from the film processor FP to the copier PR is thus designated the first transport buffer TB1 (FIG. 2), the transport area from the copier PR to the cutting and packing station FS as the second transport buffer TB2, and finally the transport area for the copy material from the copy material processor to the cutting and packing station, as the third transport buffer TB3. The number of film rolls or copy material rolls in the transport buffers TB1 and TB2 or TB3 give the fill level of the roll storage. This procedure allows a response to variations in speed in that rolls are produced with a greater or smaller fill level and a greater or smaller number of rolls are fed into the given transport buffer TB1, TB2, or TB3.

The operation of the processing apparatus 1 according to the invention is thus based on a buffer concept comprising both short-term buffers FB and PB in the form of loop storage and transport buffers TB1, TB2, and TB3. The film buffer FB accommodates brief interruptions within the first processing module 2, which may arise when, e.g., a splice is not correctly performed in the opening and splicing station OS or when damaged film C or film material N of the wrong type must be repaired or removed. The second short-term buffer, the copy material buffer PB, accommodates brief interruptions in the production of the copier PR in the second processing module 3 which may arise, e.g., when film rolls or paper rolls are made from single masters. Brief variations in the processing speed of the copier PR that arise when unusable masters are skipped or when multiple copies are made from single masters are compensated for.

The first transport buffer TB1 for the film rolls F compensates particularly for physically determined differences in the processing speeds of the film processor FP and the copy material processor PP. It also accommodates longer interruptions in operation of the copier PR due to technical errors. The film material N is stored in the second transport buffer TB2 until it can be processed together with exposed and developed copy material M in the cutting and packing station FS. This is necessary, particularly since the copy material M exposed in the copier PR must first be developed in the copy material processor PP before it can be transported on to the next processing module 4. Brief interruptions in operation of the cutting and packing station FS can also be compensated for. The third transport buffer TB3 deals with the exposed and developed copy material M coiled onto rolls P. It accommodates interruptions in operation of the final processing module 4, which may arise when, e.g., film rolls are changed or when the operating personnel have to intrude into the functioning of the cutting and packing station FS because of order-related material difficulties.

The central control unit SC monitors the supply status in the buffer storage TB1, TB2, and TB3 and controls the fill level of the individual rolls F and P according to the load level of the individual stations and optimizes the fill level with respect to throughput time. In the second processing module 3, the central control unit SC controls, e.g., both the coiling of film material N and the coiling of copy material M at the exit of the copy material processor PP in such a way that a copy material roll P with corresponding copies is produced for each film material roll F, with the film roll F and the copy material roll P preferably exhibiting the same sequence of copy masters or copies. It is particularly advantageous for the throughput time of a client order if the sequence of the negatives on film roll F is such that first negative fed into the processing apparatus 2 is positioned at the outside of the roll and if the sequence is maintained. The same naturally applies for the copy material rolls P with the exposed and developed copies.

The central control SC will also preferably control the transport of the film rolls F from the copier PR and the transport of the copy material rolls P from the exit of the copy material processor PP in such a way that corresponding film and copy material rolls F and P arrive simultaneously at the cutting and packing station FS.

The central control SC can be implemented by the central control unit 5, which preferably comprises an electronic computer, with an input and output unit, which is connected to the individual processing modules and stations via serial lines (indicated in FIG. 2 by the dotted lines SC). The signal lines permit the exchange of data in both directions. The superordinate central control SC controls the basic setting of the individual processing stations; for example, the stations will be automatically set for the paper format employed at a given time. It can receive data from the individual stations and process the data and transmit it to other stations. For example, it processes the order data recorded in the opening and splicing stations at the entrance to processing apparatus 1, transmits this data to the copier PR to assure that the desired number of copies is produced, and further transmits the data to the cutting and packing station F, where the price of the client order is printed on the packing, as based on the transmitted data.

A highly essential function that will preferably be performed by the central control SC is the recording of the position coordinates established in the copier PR of the copy masters on the film material strip N. This data is transmitted by the central control SC to the cutting and packing station FS, where the film material strip N will be cut at the correct point. This procedure permits the elimination of a notch device in the copier which stamps markings onto the film material strip N. For cases in which the number of the individual copy masters on the film material strip N is to be recorded, for example by reading the enlarged DX code positioned on the film material strip N, this information is also recorded by the central control SC. The data is transmitted by the central control SC, e.g., to the cutting and packing station FS, where the corresponding master number can be printed on the front or reverse side of the appropriate copy or copies by means of printer unit 12 (FIG. 2). Naturally the printer device can also be positioned at the exit of the copy material processor PP. In that case the central control SC transmits the data to that point, where the number is then printed.

It is of special advantage if the central control SC displays and controls the material flow in the processing apparatus 1. To this end the individual processing modules transmit information on the client order located in the given module, permitting a specific client order within the processing apparatus 1 to be located at any time by the central control SC. This is of great significance, particularly when problems arise in the processing flow and entire orders must be eliminated. For example, copies may not be produced in the copier PR due to bad film material. The position of the film strip on the film material roll can now be very simply determined. The film strip can be identified in the cutting and packing station, and rather than being cut, it can be eliminated from the ongoing process uncut, along with the corresponding order bag.

In order to minimize the throughput time of a client order O through the processing apparatus 1, the position of the roll buffers which, because of rewinding, rotate the sequence of copy masters on the film material rolls, is selected in such a way that the first client order O fed into the apparatus is also the first to leave it in processed condition.

The most essential functions of the central control SC, however, include controlling the start-up and shut-down of the individual processing modules and the processing stations positioned in the modules, as well as controlling the roll size and determining the optimal moment for cutting the material in the appropriate station, as well as the control and optimization of roll transport from one module to the next.

The function of the central control SC will be described in greater detail relative to the start-up of the processing apparatus according to the invention and to optimization of buffer management; reference is made to the diagrams in FIGS. 4a and 4b. The designations used in the diagram refer to the processing stations already described; the subscript "out" next to the designation for individual processing stations represents the exit of the given station. As regards the units indicated in brackets, [v] represents the processing speed in the processing stations and [I] represents the roll contents or fill level of the rolls. The cross-hatched areas indicate the fill level of the given transport buffer. Both diagrams work from the assumption of 500/orders/hour fed into the processing apparatus 1.

Figure 4:
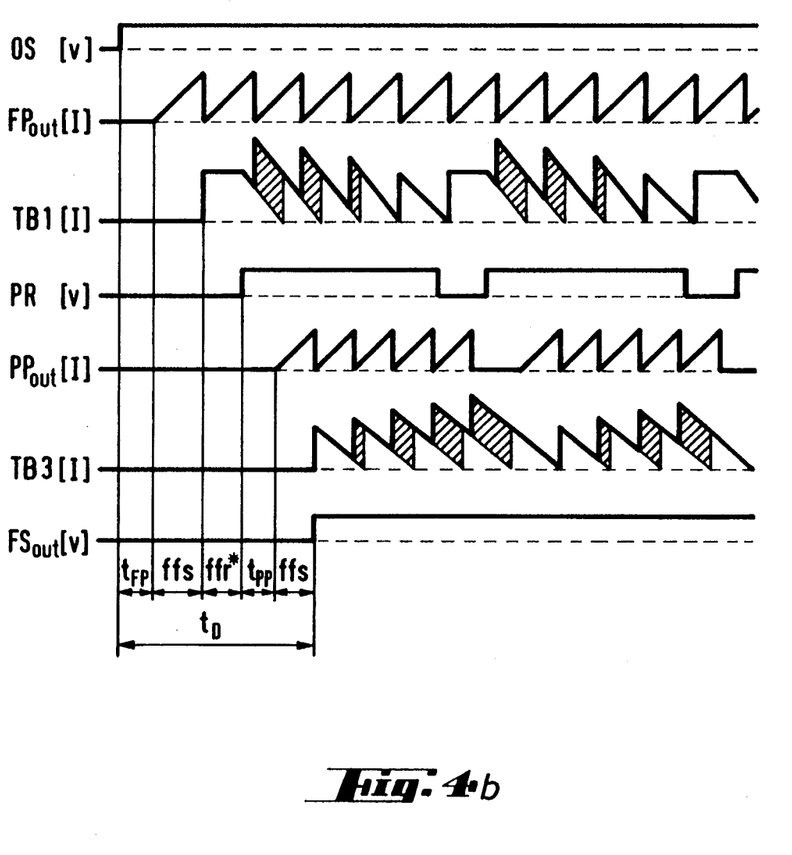
FIGS. 4a and 4b show two flow diagrams of an exemplary inventive process for operation of the photographic processing apparatus of FIG. 1.

FIG. 4a schematically depicts the normal operation of the processing apparatus 1 according to the invention. The film cartridges fed to the opening and splicing station OS are opened and film strips are spliced together to form a continuous tape N and are transported on to the film processor FP. This results in the film buffer FB positioned at the entrance to the film processor FP being filled. Only when the film buffer FB has reached the desired level will the central control SC start up the film processor FP, so that short interruptions at the opening and splicing station OS do not immediately result in interruptions in the operation of the film processor FP. An order requires a passage time of $t_{FP}$ for passage through the film buffer FB and the film processor.

When the film roll F at the exit of the film processor $FP_{out}$ reaches the cutting fill level ffs, the film material N will be cut and transported to the copier PR. Preferably the cutting will always occur at points between two different films, at which a piece of leader tape L has been inserted in the opening and splicing device. The precise moment for inserting the leader tape L between two films is determined by the central control SC. In the process, it totals the data on film lengths transmitted from the opening and splicing device and compares that data with the cutting fill level ffs. A special marking is applied to the leader tape, which is later identified by the cutting and splicing station of the film processor FP, which makes its cut at that point. Use of a leader tape L eliminates jamming when the film material N is threaded into the following processing station, e.g., the copier. In this manner the fill level ffs also determines the fill level of all other film rolls F.

The photographic copier PR is not started immediately when the film roll F is wound at the entrance side; rather, the central control SC only gives the start command when the next film roll F at the entrance to the film processor FP has reached a certain reserve fill level. This requires the time interval ffr. In this manner a roll is given intermediate storage in the first transport buffer TB1. This is indicated in FIG. 4a by the cross-hatched areas.

After starting the copy process in the copier PR the copy material buffer PB at the entrance to the copy material processor PP is first filled. As with the film processor, the central control SC only starts the copy material processor when the buffer PB has reached the predetermined fill level. The passage time of the copy material M through the copy material buffer PB and the copy material processor PP is given by the interval $t_{pp}$. The developed copy material M is coiled onto a roll P at the exit of the copy material processor $PP_{out}$. Ideally the copy material M will always be cut in such a way that for each film roll F there is precisely one paper roll P. This can be simply realized during copying in that with each new film roll, the copier PR leaves an unexposed gap on the copy material M, which will be detected on the exit side cutting and splicing station 10 of the copy material processor PP so that the material will be cut at that point. The time for producing a copy material roll P at the exit of the copy material processor $PP_{out}$ therefore corresponds approximately to the time required for producing a film roll F and is expressed by the interval ffs. The film material N is coiled at the exit of the copier PR onto a film roll F whose size corresponds to that on the entrance side.

The central control SC now controls the transport to the cutting and packing station FS in such a way that the copy material roll P arrives via transport device 8 at the same time as the corresponding film roll F via transport device 7. This may result in one or more film rolls F being given intermediate storage in the second transport buffer TB2 as long as the corresponding copy material M passes through the copy material processor PP.

The total passage time $t_D$ of a client order O through the photographic processing apparatus 1 is thus given by the total of the individual intervals. Thus the total passage time is $t_D = t_{FP} + ffs + ffr + t_{pp} + ffs$.

In normal operation the film processor FP and the copy material processor PP run at their predetermined speed. The opening and splicing station OS runs at the speed controlled by the film processor FP. The cutting and packing station FS can operate smoothly at its own speed due to the buffer concept. If it runs at too great a speed, pauses must be allowed for. If it runs too slowly, the second transport buffer TB2 for the film rolls and transport buffer TB3 for the copy material rolls must be filled with rolls.

Only in theory can the normal operation just described be maintained over a longer period of time, namely only as long as the ratio of processed film material length to copy material length is constant. During operation, however, small deviations usually arise due to unforeseeable circumstances, for example, so-called skips—the skipping of unusable copy masters on the film material N. Larger deviations from a constant length ratio result, e.g., from the use of differing copy material formats. Nonetheless, for physical reasons the film processor FP and the copy material processor PP must be operated at a constant speed. The superordinate central control SC resolves this problem in that "gaps" in the continuous material tapes (film material N or copy material M) are produced as the need arises by adding a leader tape and thereby reducing the average speed of the film material in the film processor FP and the copy material in the copy material processor PP. The transport buffer TB1 for the film rolls F and TB3 for the copy material rolls P are used to filter this gap operation, with the result that processing stations adjacent to those stations in which gaps are created can continue to run in the normal fashion.

FIG. 4b depicts this kind of unbalanced operation in the form of a diagram, as based on the case in which a copy material format is employed that is 20% smaller than in normal operation. This necessitates the copy material processor PP being operated a speed reduced by an average of 20%. This is achieved by creating a gap of 10 minutes every 50 minutes, which means that leader tape of the appropriate length is inserted in the copy material processor. A reserve fill level of film material in the film processor FP that is increased relative to normal operation is achieved with an interval ffr* which is longer than that required in normal operation. In this manner a sufficiently large reserve of film material N is made ready in the first transport buffer TB1. The insertion of gaps in the copy material processor PP also necessitates the copier PR being run at increased speed during the interim operation. As determined by the shorter copy material format, the paper rolls P at the exit of the copy material processor $PP_{out}$ become smaller or exhibit a reduced fill level.

The fill level and the residence time of rolls in the transport buffers are determined by intervals ffs and ffr. The interval ffs is determined by the desired roll size. The interval ffr determines the initial fill level of transport buffer TB1 and thus the interval for the insertion of a gap. The interval ffr is determined by the central control SC on the basis of the format setting or the length of copies and from the current order data, which is read in the opening and splicing station OS and transmitted to the central control unit 5. Here the normally anticipated skips are also incorporated in the calculation. If a long copy material format is employed or if multiple copies are to be made, a smaller value is selected for ffr. In these cases the buffer content of transport buffer TB1 is automatically increased. In order to further reduce the content of the first transport buffer TB1, the central control will provide the flow of film material N in the film processor FP with a gap, i.e., a leader tape will be inserted for a certain time. In the case of smaller copy material formats, ffr is enlarged by the amount of the passage time $t_{pp}$ of copy material M in the copy material processor PP. The result is that the gap inserted in the copy material processor PP has a magnitude at least as large as the passage time in the processor PP. Thus a complete leader tape can be incorporated, which is also transported in its entirety through the processor PP. The leader tape L is not torn apart and can be used a number of times.

The photographic processing apparatus according to the invention and the process according to the invention for operating the photographic processing apparatus allow the throughput time of a client order through the apparatus to be optimized. The hierarchical, two-level control permits the control of all critical time-related flows by a local control system. The local control monitors and controls all functions already incorporated by the processing stations. The superordinate central control provides limiting conditions and performs the optimizing function for changing the rolls and inserting gaps when timing is not critical. The total processing speed of client orders is thereby decreased and waiting times between the individual stations are shortened or eliminated entirely. The close coupling of individual stations into modules in conjunction with the automatic transport means permits a spatially efficient placement of the entire apparatus.

It will be appreciated by those of ordinary skill in the art that the present invention can be embodied in other specific forms without departing from the spirit or essential character thereof. The presently disclosed embodiments are therefore considered in all respects to be illustrative and not restrictive. The scope of the invention is indicated by the appended claims rather than the foregoing description and all changes which come within the meaning and range of equivalents thereof are intended to be embraced therein.

What is claimed is:

1. A process for operating a photographic processing apparatus having individual processing modules connected with one another for processing exposed photographic film material and/or photographic copy material, each of said modules comprising at least one processing station through which exposed film material and/or photographic copy material passes in succession, comprising the steps of:
   controlling throughput and processing speed of the film material and/or the copy material hierarchically using two levels, said step of controlling further including the steps of:
   locally controlling the processing speed of the film material or the copy material in a given preceding processing station with a local control, the speed being determined by a processing station through which film material or copy material must pass at a predetermined constant speed, and
   performing central control functions and monitoring the functioning of the individual processing modules to optimize the throughput of film material and/or copy material through the photographic processing apparatus, the processing modules being connected by signal lines to a central control unit.

2. A process according to claim 1, wherein said step of locally controlling further includes a step of:
   operating said constant speed processing station as a master to which a speed of said given preceding processing station is slaved, said step of locally controlling being autonomous and automatic after the operation of a given processing module is started.

3. A process according to claim 2, wherein said photographic processing apparatus includes a copy material processing module comprising copy material processing components which include at least a photographic copier and a copy material processor, with an adjoining copy material buffer, for developing the exposed copy material, said components being interconnected by means of signal lines, said process further including a step of:
   locally controlling the processing speed of the copy material in the photographic copier according to a predetermined constant throughput speed of the copy material processor and a fill level of the copy material buffer.

4. A process according to claim 3, wherein said photographic processing apparatus includes a film processing module comprising film processing components which include at least a film opening and splicing station and a corresponding film processor, with an adjoining film buffer, for developing the exposed film, said film processing components being interconnected by means of signal lines, said process further including a step of:
   locally controlling the processing speed of the film material in the film opening and splicing station according to a predetermined constant throughput speed of the film processor and the fill level of the film buffer.

5. A process according to claim 2 further including a step of:
   locally controlling the processing speed of the film material or of the copy material such that a film buffer or a copy material buffer assigned to a succeeding processing station is filled to a level of about 80% to about 99%.

6. A process according to claim 5, further including a step of:
   splicing a leader tape upon occurrence of an interruption of a film material feed or a copy material feed and when the fill level of the film buffer or the copy material buffer falls beneath a given point of a maximum fill level, onto the film material or copy material end in a splicing device at an entrance to the film buffer or the copy material buffer, respectively,
   removing said leader tape at an exit of a film processor or copy material processor, respectively, and
   returning the leader tape to the entrance of the film buffer or copy material buffer, respectively.

7. A process according to claim 6, further including a step of:
   transporting the film material or copy material, upon resumption of the film material or copy material feed to the film buffer or copy material buffer, respectively following said interruption, to the splicing device, where the leader tape is cut off, and a front end of the film material or copy material, respectively, is spliced to a back end of the leader tape, and the front end of the film material or copy material tape is separated from the leader tape at an exit from the film processor or copy material processor, respectively.

8. A process according to claim 7, further including a step of:
   following said resumption, splicing the front end of the film material or copy material tape to a back end of a waiting film material or copy material tape at the exit of the film processor or copy material processor, respectively.

9. A process according to claim 8, further including a step of:
coiling the film material or copy material onto rolls at the exit of the film processor or copy material processor, respectively.

10. A process according to claim 9, further including a step of:
monitoring, via the central control, the fill level of the film material or copy material rolls positioned at the exit of the film processor or copy material processor and providing control according to the load level of the processing modules.

11. A process according to claim 10, further including a step of:
transporting the film rolls in fully automatic fashion from the film processor to a photographic copier in the copy material processing module, said central control controlling said step of transporting according to demand and the load level of the processing modules, a transport device between the film and the copy material processing modules being used as a transport buffer for the film rolls.

12. A process according to claim 11, further including a step of:
coiling the film material onto rolls at the exit of the photographic copier, said central control controlling both the coiling of the film material and the coiling of the copy material at the exit of the copy material processing module in such a way that each copy material roll with developed copies corresponds to each film material roll, and a sequence of the copy masters on the film material roll correlates with a sequence of copies on the copy material roll, and the sequence of the copy masters and copies is maintained such that initially processed copy masters and copies are located at an outside of each roll.

13. A process according to claim 12, further including a step of:
controlling the transport of the film rolls from the photographic copier and the transport of the copy material rolls from the exit of the copy material processor to an automatic cutting and packing module, such that the correlated film material rolls and the copy material rolls arrive approximately simultaneously, and the transport rolls are employed as transport buffers.

14. A process according to claim 13, further including a step of:
controlling the transport of order bags for the film rolls, from which order data is removed in a film opening and splicing station, said order bags being transported from the film opening and splicing station by automatic transport devices to the cutting and packing module, with control being exercised such that a sequence of the order bags corresponds to the sequence of copy material strips on the copy material rolls transported to the cutting and packing module.

15. A process according to claim 14, transmitting from individual processing modules, information on any client order located in a given station to the central control unit via signal lines, so that at any time a given client order can be located within the photographic processing apparatus by means of the central control.

16. A process according to claim 15, further including a step of:
processing the first client order fed into the photographic processing apparatus as the first to leave the photographic processing apparatus.

17. A process according to claim 16, further including a step of:
recording position coordinates, established in the photographic copier, of individual copy masters located on the film material strip, and
transmitting the position coordinates to the cutting and packing station where the film material strip is cut at the correct point.

18. A process according to claim 17, further including a step of:
registering numbers of the individual copy masters on the film material strip, which numbers have been recorded in the photographic copier by reading an expanded DX code positioned on the film material strip, and
transmitting said numbers to the cutting and packing station where a corresponding master number is printed by a printer device on a front or reverse side of the corresponding copy or copies.

19. A photographic processing apparatus comprising:
processing modules for processing exposed photographic film material and/or photographic copy material, each of said modules having at least one processing station, exposed film material and/or photographic copy material being passed through said modules in succession,
a hierarchical, two-level control for controlling throughput and processing speeds of the film material and/or the copy material, said control further comprising:
a local control for the processing stations through which the film material or the copy material passes at a predetermined constant speed, which local control locally controls the processing speed of the film material or the copy material in a given preceding processing station, and
a superordinate central control unit connected to the processing stations by signal lines, said central computer unit performing central control functions and monitoring the processing flow in the individual processing modules to optimize throughput of film material and/or copy material through the photographic processing apparatus.

20. An apparatus according to claim 19, wherein said apparatus further comprises:
a copy material processing module having components which include a photographic printer and a copy material processor and an adjoining copy material buffer for developing exposed copy material, said components being interconnected by signal lines, and a processing speed of the copy material in the photographic copier being controlled locally as determined by a predetermined constant throughput speed of the copy material processor and a fill level of the copy material buffer.

21. An apparatus according to claim 20, wherein said apparatus further comprises:
a film processing module having film processing components which include film opening and splicing station and a corresponding film processor and an adjoining film buffer for developing the exposed film material, said film processing components being joined together by signal lines, the processing speed of the film material in the film opening and splicing station being locally controlled as determined by a predetermined constant throughput speed of the film processor and a fill level of the film buffer.

22. An apparatus according to claim 21, further including:
a cutting and splicing device positioned at an entrance to the copy material buffer and the film buffer, and at an exit of the copy material processor and the film processor, respectively, and
a docking device for a leader tape preferably coiled onto a roll positioned above or below each cutting and splicing device.

23. An apparatus according to claim 22, further including:
a docking device for rolls and a coiling device for coiling the film or copy material onto the rolls positioned at the exit of the film processor and the copy material processor.

24. An apparatus according to claim 23, further including: docking devices for film material that is coiled onto rolls, or is to be coiled, said docking device being positioned at an entrance and exit of the photographic copier, and
an adjusting device for at least one cassette containing unexposed photographic copy material coiled onto a roll being provided at the entrance to the photographic copier.

25. An apparatus according to claim 24, further including:
a cutting and packing station positioned adjacent to the copy material processor, the individual processing stations for the film material rolls and the copy material rolls being connected to the cutting and packing station by means of automatic transport device.

26. An apparatus according to claim 25, further including:
transport means for order bags positioned between the film opening and splicing station and the cutting and packing station, said transport means being fully automatic.

27. An apparatus according to claim 25, wherein the cutting and packing station further includes:
a printer device for printing master numbers on a reverse side of the copies.

28. A process for operating a photographic processing apparatus having at least two processing modules for processing photographic material, each of said at least two modules comprising at least one processing station through which the photographic material passes, said process comprising the steps of:
controlling throughput and processing speed of the photographic material hierarchically using two levels, said step of controlling further including the steps of:
locally controlling processing speed of the photographic material in a first processing station in response to a second processing speed of a second processing station through which photographic material subsequently passes at a predetermined constant speed after being output from said first processing station; and
performing concurrent control and monitoring of the at least two processing modules to optimize the throughput of photographic material through the first and second processing stations, the at least two processing modules being connected by signal lines to a central control unit for controlling a fill level of a buffer between said at least two modules.

* * * * *